United States Patent
Kim

(10) Patent No.: US 7,171,201 B2
(45) Date of Patent: Jan. 30, 2007

(54) CELL SELECTING SYSTEM AND METHOD THEREOF IN RADIO COMMUNICATION NETWORK

(75) Inventor: Jin-Hoon Kim, Ansan (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 10/418,150

(22) Filed: Apr. 18, 2003

(65) Prior Publication Data

US 2004/0203452 A1    Oct. 14, 2004

(30) Foreign Application Priority Data

May 17, 2002   (KR) ...................... 10-2002-0027490

(51) Int. Cl.
*H04Q 7/20* (2006.01)

(52) U.S. Cl. ..................... 455/434; 455/515; 370/336

(58) Field of Classification Search ................ 455/434, 455/436, 437, 515, 525, 67.11; 370/331, 370/336, 337, 347
See application file for complete search history.

(56) References Cited

U.S. PATENT DOCUMENTS 5,506,863 A *  4/1996  Meidan et al. .............. 375/134
5,825,758 A * 10/1998  Heikkinen et al. .......... 370/330
5,913,169 A *  6/1999  Vaara ......................... 455/443
6,233,451 B1  5/2001  Noerpel et al.
6,236,856 B1  5/2001  Abbadessa
6,327,469 B1  12/2001  Gaastra
6,366,602 B1  4/2002  Raitola

FOREIGN PATENT DOCUMENTS

| DE | 100 27 047 A1 | 8/2001 |
|---|---|---|
| JP | 06-350586 A | 12/1994 |
| JP | 8-505029 A | 5/1996 |
| JP | 2002-505824 A | 2/2002 |
| WO | WO-98/57513 A2 | 12/1998 |
| WO | WO-98/57513 A3 | 12/1998 |

* cited by examiner

*Primary Examiner*—Lee Nguyen
(74) *Attorney, Agent, or Firm*—Birch, Stewart, Kolasch & Birch, LLP

(57) ABSTRACT

In a cell selecting system and a method thereof in a radio communication network, a forward BCCH is constructed to contain, in each time slot of a frame, both a FCCH bit pattern and a SCH bit pattern. The method includes measuring the reception power of a forward BCCH transmitted from each cell, while detecting a FCCH bit pattern and a SCH bit pattern from a time slot of the forward BCCH and demodulating the detected bit patterns. The cell synchronization can be performed by using the demodulated information of the selected cell. Accordingly, the cell selection time and the processing load of the mobile terminal can be reduced.

20 Claims, 3 Drawing Sheets

CELL SELECTING SYSTEM AND METHOD THEREOF IN RADIO COMMUNICATION NETWORK

The present application claims, under 35 U.S.C. § 119, the foreign priority benefit of Korean Patent Application No. 27490/2002 filed May 17, 2002, the entire contents of which are herein fully incorporated by reference.

BACKGROUND OF THE INVENTION

1. Field of the Invention

The present invention relates to a mobile communication network, and in particular to a cell selecting system and a method thereof in a radio communication network.

2. Description of the Background

In general, a radio communication system such as a GPRS (general packet radio service) and a GSM (global system for mobile communications), etc. guarantees continuous Internet contact at a high data transmission speed to mobile terminals and computer users.

In a channel usage method of the radio communication system, a channel is used after mapping a logical channel to a physical channel such as a RF (radio frequency) channel, a TDMA (time division multiple access) frame and a time slot, etc. There are a TCH (traffic channel), a control channel, etc. in the logical channel. The TCH is for transmitting user data, and the control channel is for transmitting control signal information.

A broadcast control channel (BCCH) is one of the known control channels. The BCCH is a point to multi-point forward single direction channel and is used for information notification to plural mobile terminals. All mobile terminals are required to receive the BCCHs from cell base stations before a network contact can be made.

FIG. 1 illustrates a construction of a forward BCCH generated by a cell base station and used in a general radio communication system.

As depicted in FIG. 1, the BCCH consists of frames, and each frame consists of eight (8) time slots. The BCCH includes a FCCH (frequency correction channel) frame 10 and a SCH (synchronization channel) frame 12. The FCCH frame 10 and the SCH frame 12 abut each other. The FCCH frame generally carries information to perform frequency connection of a mobile terminal. The SCH frame 12 provides the mobile terminal with information it needs for its initial synchronization with a network.

As shown, the FCCH frame and the SCH frame respectively always have a FCCH bit pattern and a SCH bit pattern at a first time slot (time slot 0). The rest of the time slots (time slots 1~7) of the FCCH frame and the SCH frame are not used and have pre-determined bit patterns known as dummy burst.

Although the not-used time slots exist in each frame of the BCCH, the output power of the BCCH channel is always maintained uniformly regardless of a time slot in order to make it possible for a mobile terminal to select any time slot during a reception power measurement operation of the BCCH channel monitoring process.

A cell selecting method of a mobile terminal using the above-discussed general BCCH will be described. In general, when a mobile terminal is powered-on, the mobile terminal has to select a usable cell. Then the mobile terminal searches for cells around the selected cell periodically or sequentially, so that it can select a new cell as needed (e.g., as the mobile terminal is moved or in a handover process).

FIG. 2 is a flow chart illustrating a general cell selecting method of a conventional mobile terminal using the general BCCH of FIG. 1. Referring to FIG. 2, in order for a mobile terminal to select a cell in the early stage, the mobile terminal monitors sequentially the BCCH of each of plural cells nearby as shown at step S11. Here, each cell base station transmits its BCCH. Then the mobile terminal measures the reception power of the BCCH of each of the monitored plural cells and identifies pertinent cells having the reception power not less than a certain size as shown at step S13.

Afterward, the mobile terminal once again monitors the BCCHs of the identified cells in the order of the reception power level size as shown at step S15. Then it accesses, stores and demodulates sequentially (in the order of the reception power level size) a FCCH bit pattern and then a SCH bit pattern from each of the monitored BCCHs as shown at step S17. The mobile terminal obtains timing information from the SCH bit pattern demodulation.

Then the mobile terminal selects an appropriate cell from the identified cells based on their reception power measurements (i.e., the strength of signals received from the cell base stations) and restores SI (system information) from the timing information obtained from the SCH bit pattern demodulation of the BCCH of the selected appropriate cell as shown at step S19.

For a reselection of a cell or a selection of a new cell, the above-described cell selection method of FIG. 2 is repeated.

In the cell selection method, however, after the mobile terminal measures the BCCH reception power of cells, there is no guarantee that the mobile terminal accurately accesses a first time slot (time slot 0) of the FCCH (and/or SCH) frame of the BCCH of a pertinent cell. Since the FCCH and SCH bit patterns are stored only at time slot 0 of the corresponding frame, there is a high probability that the mobile terminal will access other time slots (time slots 1~7) first when it is time to access the FCCH/SCH bit patterns.

Accordingly, in the above-described cell selecting method, the mobile terminal first must measure the reception power of the BCCHs of multiple cells, and then must re-monitor the BCCHs of certain pertinent cells in the order of the size of reception power to locate and detect a first time slot having a FCCH bit pattern and a first time slot having a SCH bit pattern, of the frames of each pertinent cell. Thus, certain cells are monitored repeatedly in time by the mobile terminal.

Because the same cells are monitored repeatedly (i.e., to measure the reception power of BCCHs and to access and demodulate FCCH bit patterns and SCH bit patterns of the BCCHs), a longer cell synchronization time is consumed, and accordingly a cell selecting time is prolonged undesirably.

In addition, in the above-described cell selecting method, by monitoring the BCCHs of the same cells repeatedly, a processing load of the mobile terminal is increased greatly.

SUMMARY OF THE INVENTION

In order to solve the above-mentioned problems, it is an object of the present invention to provide a cell selecting system and a method thereof in a radio communication network, which perform a reception power measuring operation and a forward channel demodulation operation simultaneously, so as to reduce a cell selection time and a cell reselection time by eliminating duplication in monitoring the forward channel.

It is another object of the present invention to provide a cell selecting system and a method thereof in a radio communication network, which are capable of reducing a cell selection time by processing the measurement of the reception power of a forward BCCH and the demodulation of a FCCH bit pattern and a SCH bit pattern of the BCCH, simultaneously.

It is yet another object of the present invention to provide a cell selecting system and a method thereof in a radio communication network, which are capable of selecting a cell without having to repeatedly monitor the forward BCCH of the same pertinent cell(s) by constructing each time slot of one or more frames of the forward BCCH to have both a FCCH bit pattern and a SCH bit pattern therein.

It is still another object if the present invention to provide a cell selection system and method which overcome problems and limitations associated with the related art.

In order to achieve the above-mentioned objects, an embodiment of the present invention is directed to a cell selecting system in a radio communication network, the system comprising: at least one device which broadcasts a forward broadcast control channel (BCCH); and a mobile terminal which measures a reception power level of the forward BCCH and demodulates certain data bit patterns contained in the forward BCCH, simultaneously, so as to select an appropriate cell.

In order to achieve the above-mentioned objects, an embodiment of the present invention is directed to a mobile terminal which receives a forward broadcast control channel (BCCH) from at least one cell, and measures a reception power level of the forward BCCH while demodulating certain data bit patterns contained in the forward BCCH, so as to select an appropriate cell.

In order to achieve the above-mentioned objects, an embodiment of the present invention is directed to a forward channel demodulation method of a cell selecting system in a radio communication network, the method comprising: monitoring a forward channel; and measuring a reception power level of the forward channel and demodulating certain bit patterns contained in the forward channel, simultaneously.

In order to achieve the above-mentioned objects, an embodiment of the present invention is directed to a cell selecting method usable in a radio communication network, the method comprising: receiving a forward channel from each cell; measuring a reception power of the received forward channel while accessing and demodulating data bits from the forward channel of a pertinent cell; and selecting a cell having the greatest power reception based on the measured reception power and performing a cell synchronization with the selected cell on the basis of the demodulated data bits.

In order to achieve the above-mentioned objects, an embodiment of the present invention is directed to a method of obtaining at least one of a frequency correction channel (FCCH) bit pattern and a synchronization channel (SCH) bit pattern from a control channel, the method comprising: accessing any one of time slots of a certain frame of the control channel and thereby obtaining said at least one of the FCCH and SCH bit patterns.

In order to achieve the above-mentioned objects, an embodiment of the present invention is directed to a forward channel usable in a radio communication network, comprising at least one frame having a plurality of time slots per frame, each of the time slots having therein both a frequency correction channel (FCCH) bit pattern and a synchronization channel (SCH) bit pattern.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, the preferred embodiments of the present invention will be described with reference to accompanying drawings.

In the embodiments of the present invention, any unnecessarily detailed explanation obscuring the purpose of the present invention will be abridged.

Figure 1:
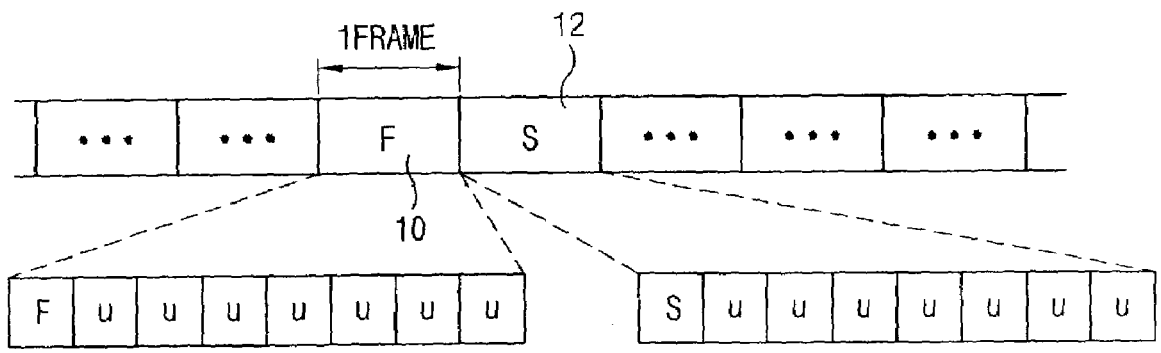
FIG. 1 illustrates a structure of a forward BCCH used in a general radio communication system.
Figure 2:
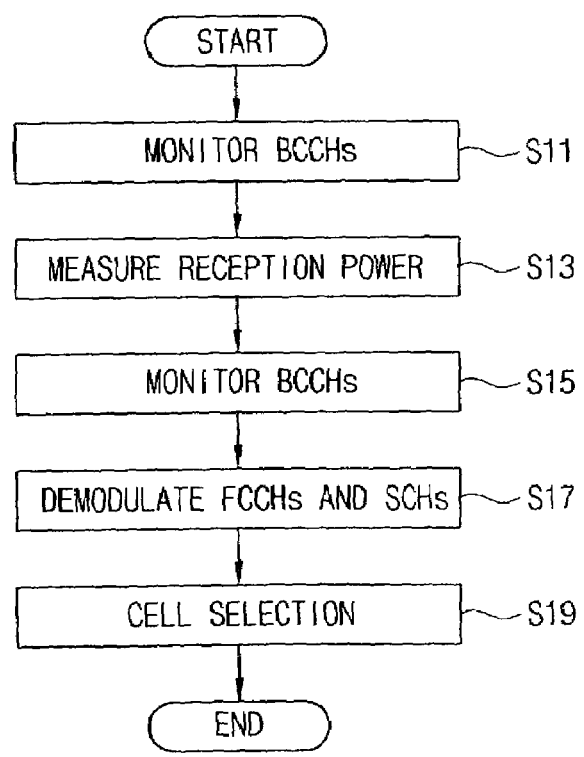
FIG. 2 is a flow chart illustrating a general cell selecting method of a mobile terminal using a BCCH.
Figure 3:
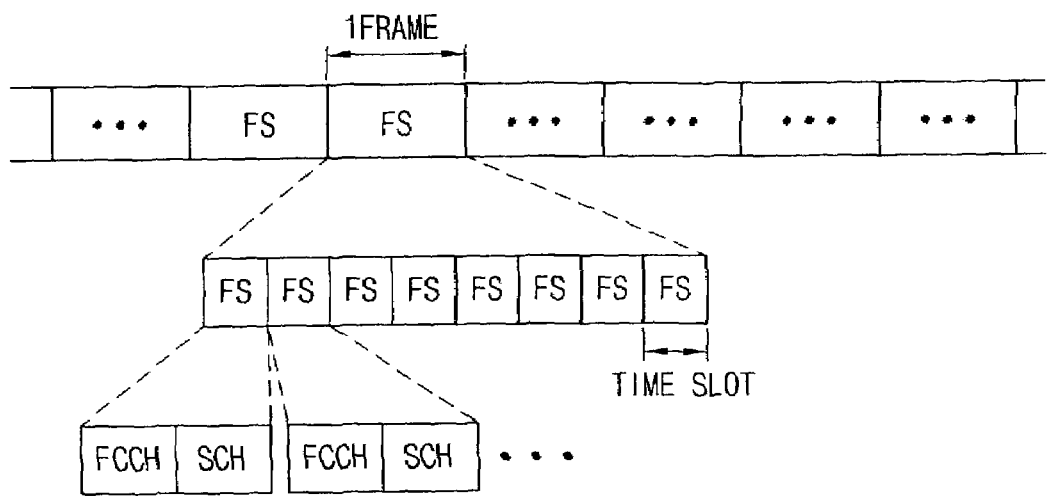
FIG. 3 illustrates a structure of a forward control channel in accordance with an embodiment of the present invention.

FIG. 3 illustrates a structure of a forward control channel as an example in accordance with an embodiment of the present invention. This structure of the forward control channel is used by cell base stations or other transmitting devices to propagate their corresponding forward control channel to mobile terminals or other receiving devices.

As depicted in FIG. 3, a forward BCCH includes one or more frames where at least one FCCH bit pattern and at least one SCH bit pattern exist in at least one of the frames. In more detail, a frame of the forward BCCH has 8 time slots (time slots 0~7), and each of the 8 time slots have both the FCCH bit pattern and the SCH bit pattern therein. In this example, it is possible have a FCCH bit pattern of '0' bits and a SCH bit pattern of only information bits. In other examples, a frame of the forward BCCH may have a different number of time slots where each of these time slots carry both the FCCH bit pattern and the SCH bit pattern therein.

Figure 4:
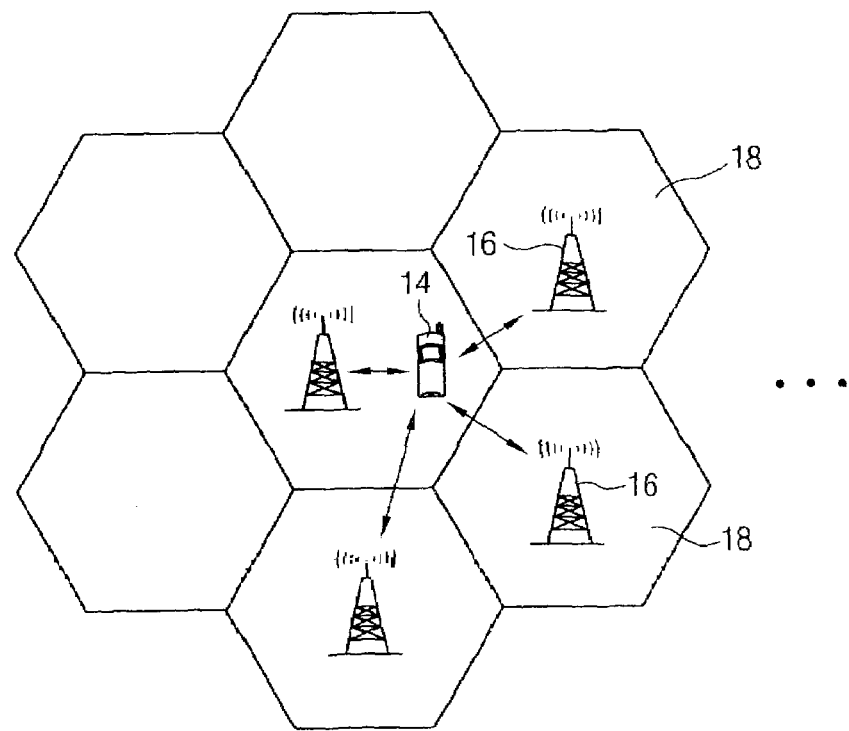
FIG. 4 illustrates an example of a mobile communication system according to an embodiment of the present invention.
Figure 5:
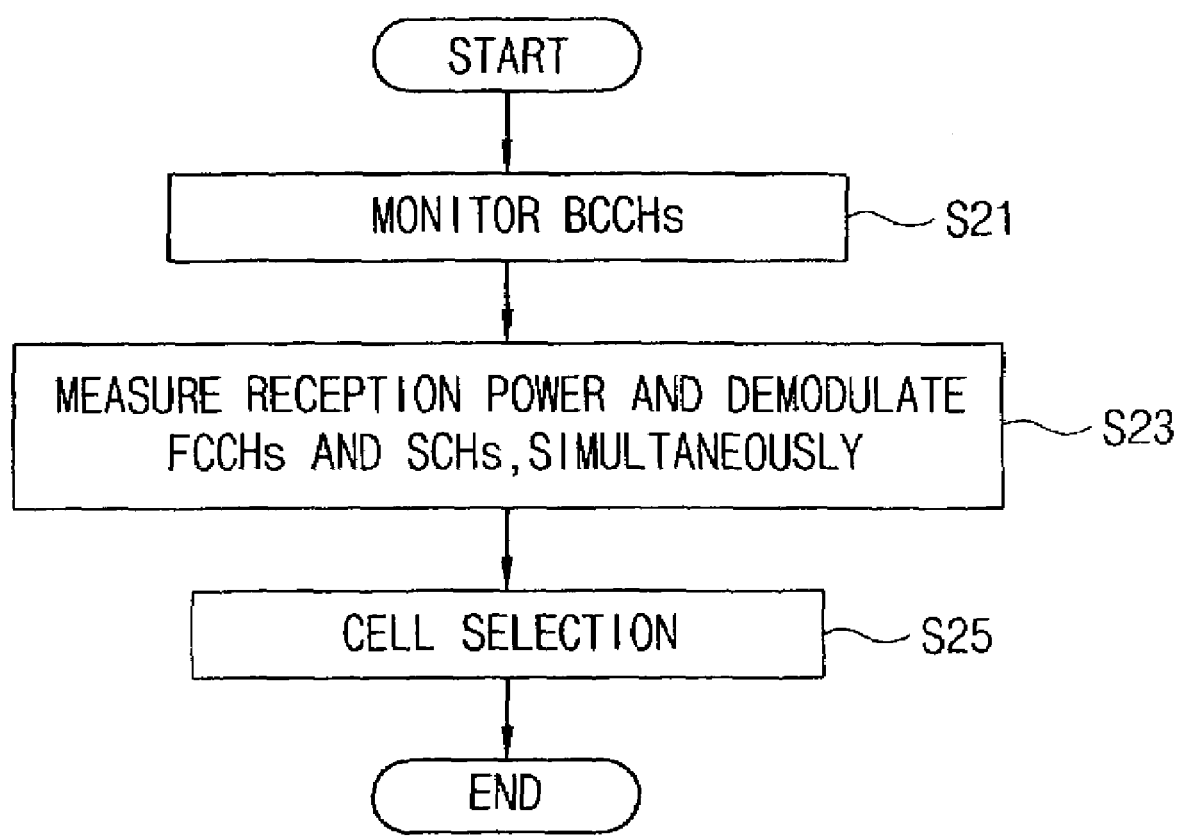
FIG. 5 is a flow chart illustrating a cell selecting method of a mobile terminal in accordance with an embodiment of the present invention.

A cell selecting method of a mobile terminal by using the forward BCCH of FIG. 3 according to an embodiment of the present invention will be described by referring to FIGS. 4 and 5. FIG. 4 is an example of a simplified view of a mobile communication system according to an embodiment of the present invention, and FIG. 5 is a flow chart illustrating a cell selecting method of a mobile terminal in accordance with an embodiment of the present invention. The method of FIG. 5 is implementable in the system of FIG. 4 or any other suitable system.

In a radio communication network, base stations 16 of nearby cells 18 as shown in FIG. 4 propagate their own forward BCCH to a mobile terminal 14. The BCCHs from the base stations 16 have the structure as shown in FIG. 3. The mobile terminal 14 has known components and configurations, except for any modifications thereto to implement the present invention. Such modifications can be implemented by one skilled in the art using existing techniques.

Referring to FIG. 5, to select an appropriate cell among the cells 18, the mobile terminal 14 in the power-on state monitors the BCCHs of plural nearby cells in order to perform an early cell selection as shown at step S21. The mobile terminal 14 measures the reception power of the BCCH from each of the monitored plural cells. At the same time, the mobile terminal 14 accesses and stores a FCCH bit pattern and a SCH bit pattern both from a single time slot of each of the monitored BCCHs, and demodulates the stored FCCH bit patterns and SCH bit patterns separately as shown at step S23. That is, the mobile terminal 14 measures the reception power of the BCCHs and simultaneously accesses and demodulates the FCCH and SCH bit patterns from the BCCHs.

Herein, not only the first time slot of a pertinent frame of the forward BCCH of each monitored cell has the FCCH bit pattern and the SCH bit pattern, but all time slots of the pertinent frame of the forward BCCH of each monitored cell each have both a FCCH bit pattern and a SCH bit pattern therein. Thus, it is possible to obtain both a FCCH bit pattern and a SCH bit pattern by accessing any one time slot of the pertinent frame of the forward BCCH.

Then at step 25, the mobile terminal 14 selects a cell having the greatest reception power level based on the size of the measured reception power of the BCCHs. The mobile terminal 14 restores SI of the selected cell by using the timing information obtained from the demodulated SCH bit pattern of the BCCH of the selected cell. This completes the cell selection method.

For a cell reselection process, the same operation of FIG. 4 is performed.

The present invention has the following advantages.

In the present invention, by having both a FCCH bit pattern and a SCH bit pattern in each of the time slots of a frame (or frames) of a forward BCCH, a mobile terminal can detect both a FCCH bit pattern and a SCH bit pattern instantly only by accessing any one time slot of the frame of the forward BCCH. This ensures that the mobile terminal always and instantaneously obtains accurately the FCCH and SCH bit patterns as needed and reduces the time needed to obtain the FCCH and SCH bit patterns from the BCCH.

Further, because a mobile terminal can detect both a FCCH bit pattern and a SCH bit pattern instantly only by accessing any one of the time slots of the frame of the BCCH, it is possible to perform this bit pattern detection operation and the demodulation of the FCCH and SCH bit patterns while the mobile terminal measures the reception power of the pertinent time slot. Accordingly, there is no need to monitor the BCCH of the same cell(s) repeatedly. This decreases the processing load of the mobile terminal greatly.

Moreover, by processing the measurement of the reception power level of each forward BCCH and the demodulation of a FCCH bit pattern and a SCH bit pattern simultaneously, a mobile terminal can be quickly synchronized with the selected cell. Accordingly, the present invention reduces greatly the cell selection time and the cell reselection time.

The invention being thus described, it will be obvious that the same may be varied in many ways. Such variations are not to be regarded as a departure from the spirit and scope of the invention, and all such modifications as would be obvious to one skilled in the art are intended to be included within the scope of

The invention claimed is:

1. A cell selecting system in a radio communication network, the system comprising:
   at least one device which broadcasts a forward broadcast control channel (BCCH); and
   a mobile terminal which accesses any one of time slots of a pertinent frame of the forward BCCH to demodulate certain data bit patterns, each time slot of the pertinent frame of the forward BCCH including both a frequency correction channel (FCCH) bit pattern and a synchronization channel (SCH) bit pattern therein.

2. The system of claim 1, wherein the device is a base station in the packet-based radio communication network.

3. The system of claim 1, wherein the mobile terminal measures a reception power level of the forward BCCH and demodulates the certain data bit patterns contained in the forward BCCH, simultaneously, so as to select an appropriate cell.

4. A mobile terminal which accesses any one of time slots of a pertinent frame of a forward broadcast control channel (BCCH) to demodulate certain data bit patterns, each time slot of the pertinent frame of the forward BCCH including both a frequency correction channel (FCCH) bit pattern and a synchronization channel (SCH) bit pattern therein.

5. The mobile terminal of claim 4, wherein the mobile terminal receives the forward BCCH from at least one cell, and measures a reception power level of the forward BCCH while demodulating the certain data bit patterns contained in the forward BCCH, so as to select an appropriate cell.

6. A forward channel demodulation method of a cell selecting system in a packet-based radio communication network, the method comprising:
   monitoring a forward channel; and
   measuring a reception power level of the forward channel and demodulating certain bit patterns contained in the forward channel,
   wherein the demodulating step includes accessing one time slot of a frame of the forward channel, the one time slot including both a frequency correction channel (FCCH) bit pattern and a synchronization channel (SCH) bit pattern.

7. The method of claim 6, wherein, in the monitoring step, each time slot of a frame of the forward channel includes the certain bit patterns.

8. The method of claim 6, wherein, in the monitoring step, the forward channel is a forward broadcast control channel (BCCH), and the certain bit patterns include a frequency correction channel (FCCH) bit pattern and a synchronization channel (SCH) bit pattern.

9. The method of claim 6, wherein the measuring step and the demodulating step are performed simultaneously.

10. A cell selecting method usable in a radio communication network, the method comprising:
    receiving a forward channel from each cell;
    measuring a reception power of the received forward channel while accessing and demodulating data bits that include a frequency correction channel (FCCH) bit pattern and a synchronization channel (SCH) bits from the forward channel of a pertinent cell, wherein the forward channel includes a forward broadcast control channel (BCCH) and each time slot of a frame of the forward BCCH contains therein the FCCH bit pattern and the SCH bit pattern; and selecting a cell having the greatest power reception based on the measured reception power and performing a cell synchronization with the selected cell on the basis of the demodulated data bits.

11. The method of claim 10, wherein the accessing and demodulating step comprises:

detecting a frequency correction channel (FCCH) bit pattern and a synchronization channel (SCH) bit pattern from the forward channel and storing the detected bit patterns; and demodulating the stored FCCH bit pattern and SCH bit pattern separately.

12. The method of claim 11, wherein the detecting step includes accessing any one time slot of a certain frame of the forward channel to detect the FCCH bit pattern and the SCH bit pattern.

13. A method of obtaining at least one of a frequency correction channel (FCCH) bit pattern and a synchronization channel (SCH) bit pattern from a control channel, the method comprising:

accessing any one of time slots of a certain frame of the control channel and thereby obtaining said at least one of the FCCH and SCH bit patterns, wherein both the FCCH and SCH bit patterns are obtained by accessing any one of the time slots.

14. A forward channel data structure embodied in a computer-readable medium and usable in a radio communication network, the data structure comprising at least one frame having a plurality of time slots per frame, each of the time slots having therein both a frequency correction channel (FCCH) bit pattern used in frequency correction and a synchronization channel (SCH) bit pattern used in synchronization.

15. The forward channel data structure of claim 14, wherein the forward channel is a forward broadcast control channel (BCCH).

16. The forward channel data structure of claim 14, wherein each frame includes 8 time slots.

17. The forward channel data structure of claim 14, wherein the computer-readable medium is a carrier wave received by a mobile terminal.

18. The forward channel data structure of claim 14, wherein the computer-readable medium is a storage of a mobile terminal.

19. A mobile terminal which receives a broadcast control channel (BCCH) from at least one cell, and accesses and processes one time slot of a frame of the BCCH, wherein the one time slot includes both a frequency correction channel (FCCH) bit pattern and a synchronization channel (SCH) bit pattern.

20. A cell selecting method usable in a radio communication network, the method comprising:

receiving a broadcast control channel (BCCH) from at least one cell; and accessing and processing one time slot of a frame of the BCCH, wherein the one time slot includes both a frequency correction channel (FCCH) bit pattern and a synchronization channel (SCH) bit pattern.

* * * * *